(12) United States Patent
Zhao et al.

(10) Patent No.: US 8,798,063 B2
(45) Date of Patent: Aug. 5, 2014

(54) INFORMATION PROCESSING APPARATUS AND INFORMATION PROCESSING METHOD

(75) Inventors: Fangming Zhao, Saitama-ken (JP); Toshinari Takahashi, Tokyo (JP); Shinji Yamanaka, Tokyo (JP); Yuichi Komano, Kanagawa-ken (JP); Kentaro Umesawa, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 290 days.

(21) Appl. No.: 13/229,227

(22) Filed: Sep. 9, 2011

(65) Prior Publication Data
US 2012/0243541 A1 Sep. 27, 2012

(30) Foreign Application Priority Data
Mar. 24, 2011 (JP) ................. P2011-065267

(51) Int. Cl.
*H04L 12/28* (2006.01)
(52) U.S. Cl.
USPC ......................................... 370/392
(58) Field of Classification Search
None
See application file for complete search history.

(56) References Cited

U.S. PATENT DOCUMENTS

| 6,092,191 A | 7/2000 | Shimbo et al. |
| 7,024,552 B1 | 4/2006 | Caswell et al. |
| 7,174,458 B2 | 2/2007 | Araki et al. |
| 7,366,170 B2 | 4/2008 | Umesawa et al. |
| 7,735,084 B2 | 6/2010 | Nagano |
| 2002/0035685 A1 | 3/2002 | Ono et al. |
| 2003/0056097 A1 | 3/2003 | Araki et al. |
| 2003/0221011 A1 | 11/2003 | Shitano |
| 2007/0130466 A1 | 6/2007 | Isozaki et al. |
| 2011/0026505 A1* | 2/2011 | Trainin .................... 370/338 |
| 2012/0167160 A1* | 6/2012 | Carney et al. ............... 726/1 |

FOREIGN PATENT DOCUMENTS

| JP | 9-214556 | 8/1997 |
| JP | 2003-091503 | 3/2003 |
| JP | 2003-125022 | 4/2003 |

* cited by examiner

*Primary Examiner* — Minh-Trang Nguyen
(74) *Attorney, Agent, or Firm* — Nixon & Vanderhye, P.C.

(57) ABSTRACT

An apparatus includes a first processing unit to judge, whether the route information storing unit stores a second next destination address; a second processing unit to judge whether a received packet includes an message authentication code, in the case where the route-information storing unit stores the second next destination address; a third processing unit to judge whether the key-information storing unit stores a second shared key, which is a first shared key shared between the information processing apparatus, in the case where the received packet does not include the message authentication code for the second next destination address; a third packet generating unit to generate a third packet, which includes a next destination and information indicating that the generation of an message authentication code is impossible, in the case where the key information storing unit does not store the second shared key.

15 Claims, 12 Drawing Sheets

| GOAL DESTINATION (ULTIMATE-DESTINATION ADDRESS) | FORWARDING DESTINATION (FORWARDING-DESTINATION ADDRESS) | FORWARDING PERMITTED/UNPERMITTED |
|---|---|---|
| MDMS12sa | RELAYING APPARATUS 10sa | UNPERMITTED |
| MDMS12sa | RELAYING APPARATUS 10se | PERMITTED |
| MDMS12sb | RELAYING APPARATUS 10sa | PERMITTED |
| MDMS12sb | RELAYING APPARATUS 10se | PERMITTED |
| MDMS12sc | RELAYING APPARATUS 10se | PERMITTED |
| MDMS12sc | RELAYING APPARATUS 10sg | UNPERMITTED |

FIG. 3

| No | SHARED KEY |
|---|---|
| 1 | K (B-C) |
| 2 | K (A-B-D) |

FIG. 4

INFORMATION PROCESSING APPARATUS AND INFORMATION PROCESSING METHOD

CROSS-REFERENCE TO RELATED APPLICATION

This application is based upon and claims the benefit of priority from Japanese Patent Application No. P2011-065267, filed on Mar. 24, 2011; the entire contents of which are incorporated herein by reference.

FIELD

Embodiments of the invention relate to a technology to relay data.

BACKGROUND

Authentication information (massage authentication code) termed as message authentication code (MAC) is commonly used to authenticate packets transferred between terminal apparatuses over a network. When a packet is transferred from a source apparatus to a destination apparatus via multiple relaying apparatuses located along the packet transfer route, the source apparatus transmits the packet with attachment of multiple MACs (message authentication codes) that correspond respectively to the multiple relaying apparatuses along the route. The attachment of the MACs to the packet enables the relaying apparatuses to verify the packet in turn.

The use of a MAC-authentication technique makes it possible to prevent any evil-minded attacker from gaining unauthorized access to the terminal apparatuses via the multiple relaying apparatuses located along the communication route. In addition, the use of the MAC-authentication technique also makes it possible to detect a fraudulent tampering of a packet.

BRIEF DESCRIPTION OF THE DRAWINGS

FIG. 3 is a diagram illustrating an example of route information of the first embodiment.

FIG. 4 is a diagram illustrating an example of key information of the first embodiment.

DETAILED DESCRIPTION

Figure 1:
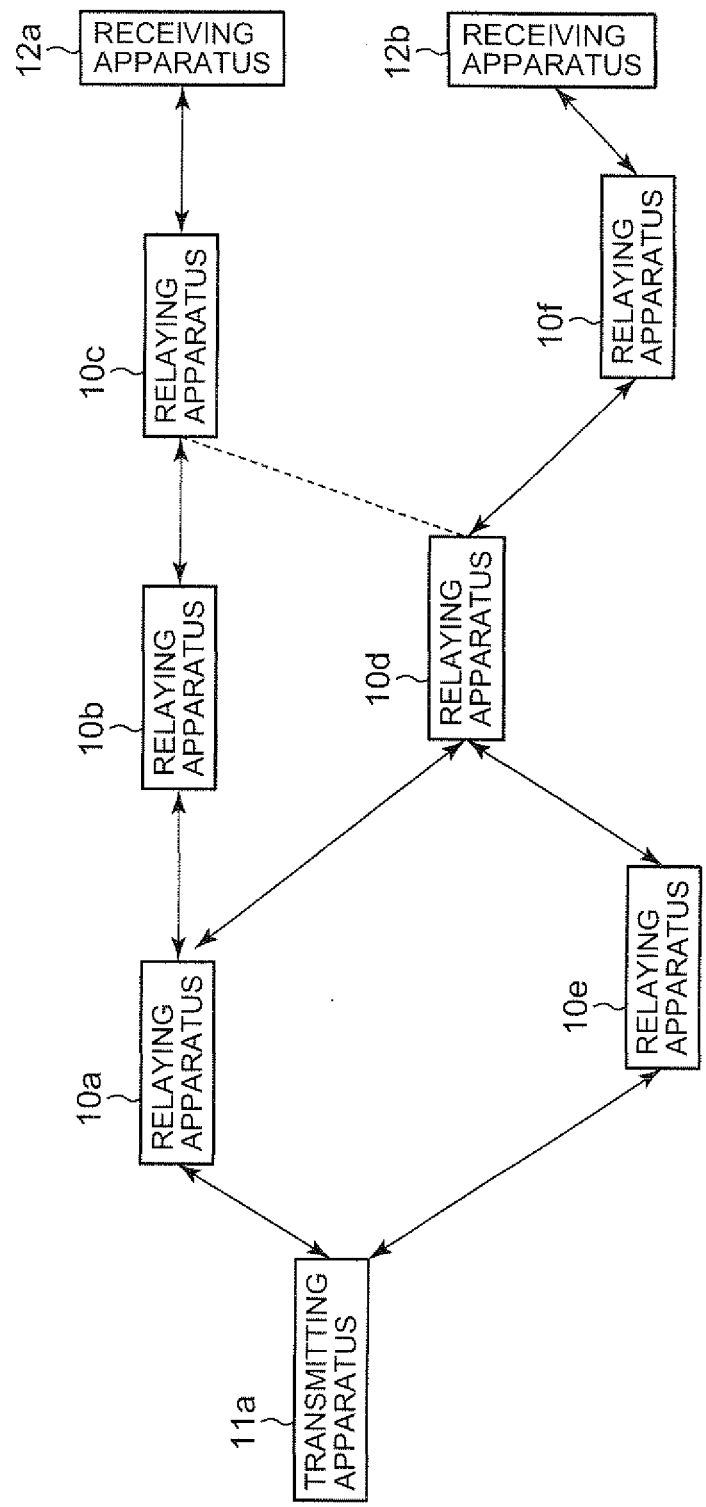
FIG. 1 is a diagram illustrating an example of a system where an information processing apparatus of an embodiment is used.

The relaying apparatuses located along the communication routes fail, in some cases, to forward the packet with attachment of the multiple MACs (message authentication codes), because of bad connection conditions of the network or other reasons.

In addition, the more relaying apparatuses a packet needs to pass through until reaching the destination, the more MACs (message authentication codes) are attached to the packet. This causes a significant negative influence on the network and the relaying apparatuses from the view point of communication efficiency.

An aspect of one embodiment has been made in view of the above circumstance. An object of one aspect of the embodiment is to reduce the number of the MACs (message authentication codes) to be attached to a packet when the transfer of the packet with the attachment of the MACs (message authentication codes) fails between relaying apparatuses.

An information processing apparatus of a first aspect of the present embodiment includes a receiving unit configured to receive a first packet sent from a first apparatus, the first packet including data and an ultimate-destination address representing address information of an ultimate destination; a route-information storing unit configured to store the ultimate-destination address and a first next destination address representing address information of a next forwarding destination, the stored ultimate-destination address and first next destination address associated with each other; a route-information checking unit configured to check, on the received ultimate-destination address, whether or not the route-information storing unit stores a second next destination address which is a first next destination address not having been sent yet; a second processing unit configured to judge, on the basis of the first packet and the second next destination address, whether or not the first packet further includes a message authentication code corresponding to the second next destination address, the second processing unit performing the judgment if the route-information storing unit stores the second next destination address; a key-information storing unit configured to store a first shared key, which is a key shared between the information processing apparatus itself and a different information processing apparatus; a first-packet generating unit configured to generate a first packet on a basis of the first packet and the second next destination address if the first packet includes the message authentication code corresponding to the second next destination address; a third processing unit configured to judge whether or not the key-information storing unit stores a second shared key, which is a first shared key shared between the information processing apparatus itself and an information processing apparatus corresponding to the second next destination address, the third processing unit performing the judgment if the received packet does not include the message authentication code corresponding to the second next destination address; a message authentication code generating unit configured to generate a first message authentication code on a basis of the data and the second shared key if the key-information storing unit stores the second shared key; a second-packet generating unit configured to generate a second packet including the ultimate-destination address, the data, and the first message authentication code; a third-packet generating unit configured to generate a third packet, which includes a next destination and information indicating that the generation of a message authentication code is impossible, if the key-information storing unit does not store the second shared key; and a transmitting unit configured to transmit any one of the first packet, the second packet, and the third packet.

Another aspect of the embodiment is characterized by including: includes a receiving unit configured to receive a first packet sent from a first apparatus, the first packet including data, a message authentication code, and an ultimate-destination address representing address information of an ultimate destination; a message authentication code verifying unit configured to verify whether or not the received packet includes a proper message authentication code; a transfer-control information processing unit configured to change a value set in transfer-control information by a predetermined method if, as a result of the verification, the received packet includes the proper message authentication code; a route-information storing unit configured to store the ultimate-destination address and a first next destination address representing address information of a next forwarding destination, the stored ultimate-destination address and first next destination address associated with each other; a first processing unit configured to judge, on the basis of the received ultimate-destination address, whether or not the route-information storing unit stores a second next destination address, which is the first next destination address to which transmission can be directed; a second processing unit configured to judge, on the basis of the first packet and the second next destination address, whether or not the first packet further includes a message authentication code corresponding to the second next destination address, the second processing unit performing the judgment if the route-information storing unit stores the second next destination address; a key-information storing unit configured to store a first shared key, which is a key shared between the information processing apparatus itself and a different information processing apparatus; a first-packet generating unit configured to generate a first packet on a basis of the first packet and the second next destination address if the received packet includes the message authentication code corresponding to the second next destination address; a third processing unit configured to judge whether or not the key-information storing unit stores a second shared key, which is a first shared key shared between the information processing apparatus itself and another information processing apparatus corresponding to the second next destination address, the third processing unit performing the judgment if the first packet does not include the message authentication code corresponding to the second next destination address; a message authentication code generating unit configured to generate a first message authentication code on a basis of the data and the first shared key if the key-information storing unit stores the second shared key; a second-packet generating unit configured to generate a second packet including the ultimate-destination address, the data, and the first message authentication code; a third-packet generating unit configured to generate a third packet, which includes a next destination and information indicating that the generation of a message authentication code is impossible, if the key-information storing unit does not stores the first shared key; and a transmitting unit configured to transmit the first packet, the second packet or the third packet.

First Embodiment

A first embodiment of the invention will be described in detail below by referring to the drawings.

FIG. 1 is a diagram illustrating an example of a configuration of a communication network where an information processing apparatus of an embodiment of the invention is used. The following description will be given for this embodiment by showing a relaying apparatus as an example of the information processing apparatus is a relaying apparatus.

The communication network includes transmitting apparatuses (11a, . . . ), multiple relaying apparatuses (10a to 10f), and receiving apparatuses (12a, 12b, . . . ). The transmitting apparatus 11a is linked to the relaying apparatuses (10a to 10f). The transmitting apparatus 11a sends a packet to the relaying apparatuses (10a to 10f) while designating the receiving apparatus 12a as the ultimate destination.

Each of the relaying apparatuses (10a to 100 is connected to: one or more transmitting apparatuses and one or more other relaying apparatuses; one or more other relaying apparatuses; or one or more other relaying apparatuses and one or more receiving apparatuses. One of the relaying apparatuses (10a to 10f) included in this communication network is connected to multiple other relaying apparatuses. Each relaying apparatus receives packets, and sends the received packets to either another relaying apparatus or a receiving apparatus. Each receiving apparatus receives packets.

Figure 2:
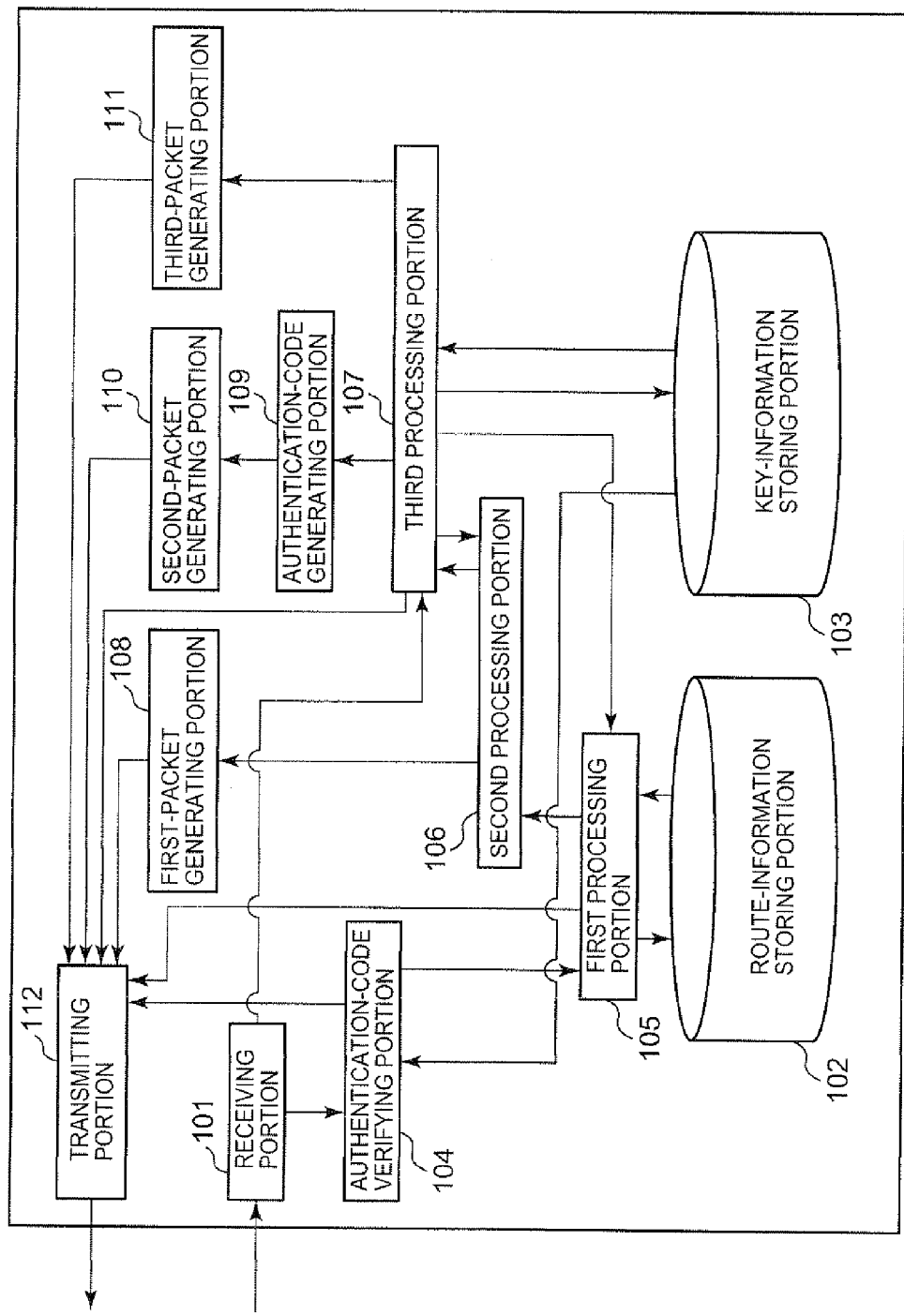
FIG. 2 is a diagram illustrating a configuration of a first embodiment.

FIG. 2 is a diagram illustrating an example of a configuration of an information processing apparatus (a relaying apparatus in this case) of this embodiment of the invention.

Each relaying apparatus 10 includes a receiving unit 101, a message authentication code verifying unit 104, a route-information storing unit 102, a first processing unit 105 (route-information extracting unit), a second processing unit 106, a key-information storing unit 103, a third processing unit 107, a message authentication code generating unit 109, a first-packet generating unit 108, a second-packet generating unit 110, a third-packet generating unit 111, and a transmitting unit 112.

The receiving unit 101 receives a packet (S1 packet) sent by either a transmitting apparatus or a different relaying apparatus. In this respect, the transmitting apparatus or the different relaying apparatus that sends the packet (S1 packet) to the relaying apparatus will be referred to as a "previous source apparatus." The receiving unit 101 passes the received packet (S1 packet) to the message authentication code verifying unit 104. The packet (S1 packet) includes: data; a message authentication code generated from the data and a key possessed by the transmitting apparatus; address information of the previous source apparatus; and address information of the ultimate destination of the packet (S1 packet) (ultimate-destination address).

The route-information storing unit 102 stores route information. The route information includes information in which the ultimate-destination address and address information of a next destination for forwarding the packet (first next destination address) are associated with each other. In addition, the information included in the route information may be further associated with information indicating whether or not a particular address is a forwarding target candidate (forwarding-target candidate information). The ultimate-destination address in this embodiment is address information of the receiving apparatus. The route information is used to determine where to forward the received packet. Another relaying apparatus or a receiving apparatus which is the next forward destination will be referred to as a "next forwarding-destination apparatus."

FIG. 3 is a diagram illustrating an example of the route information stored in the route-information storing unit 102. The route information shown in FIG. 3 stores a goal destination (the ultimate-destination address), a forwarding destination (forwarding-destination address), and information on whether or not the forwarding is permitted (i.e., information indicating whether or not each particular address is a forwarding target candidate), which are associated with one another.

The key-information storing unit 103 stores a shared key shared between the relaying apparatus and the transmitting apparatus, a shared key shared between the relaying apparatus and another relaying apparatus, or a shared key shared between the relaying apparatus and the receiving apparatus.

Figure 4:
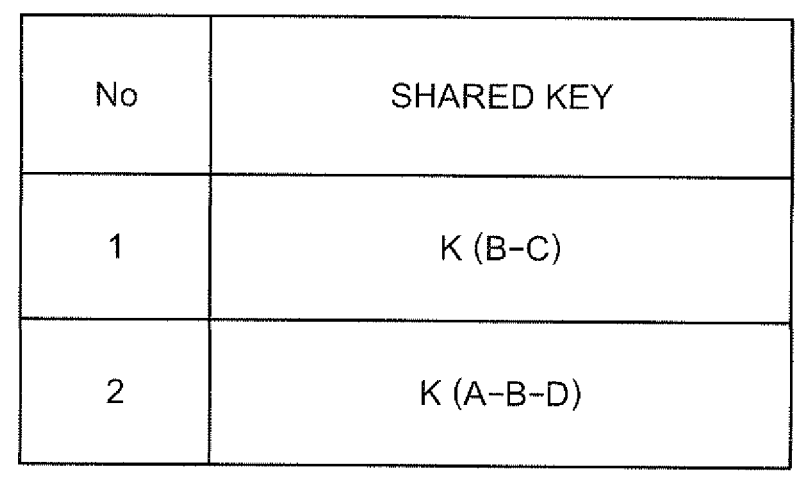
Figure 11:
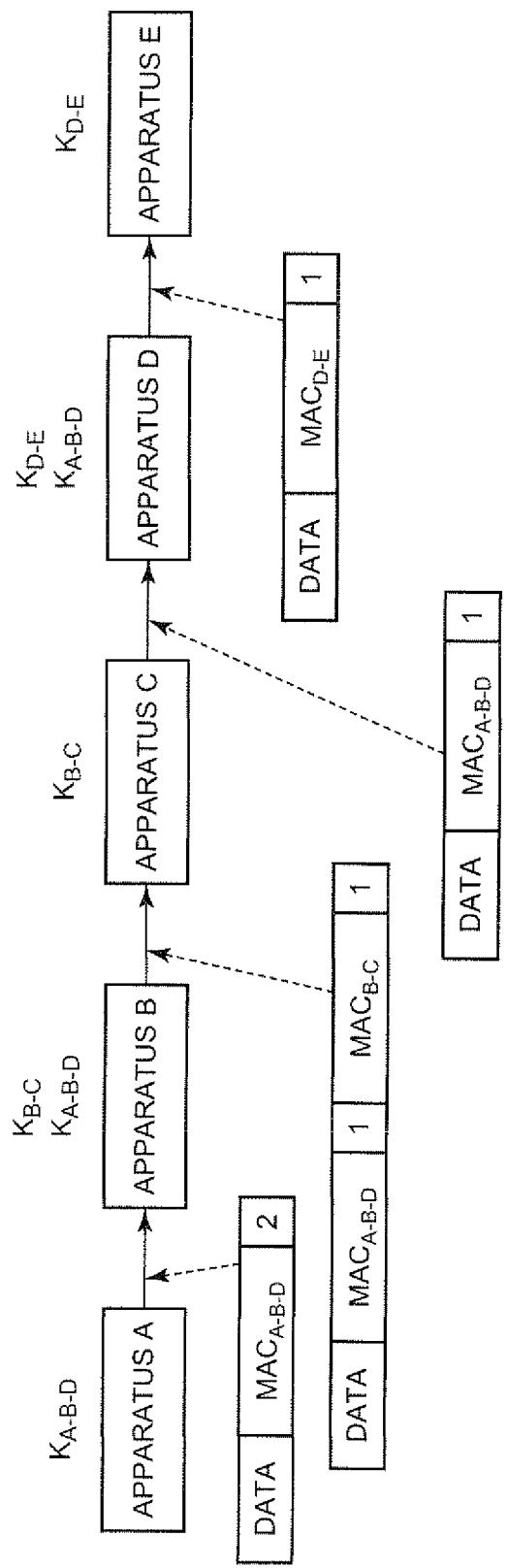
FIG. 11 is a diagram illustrating an example of the operations of the second embodiment.
Figure 12:
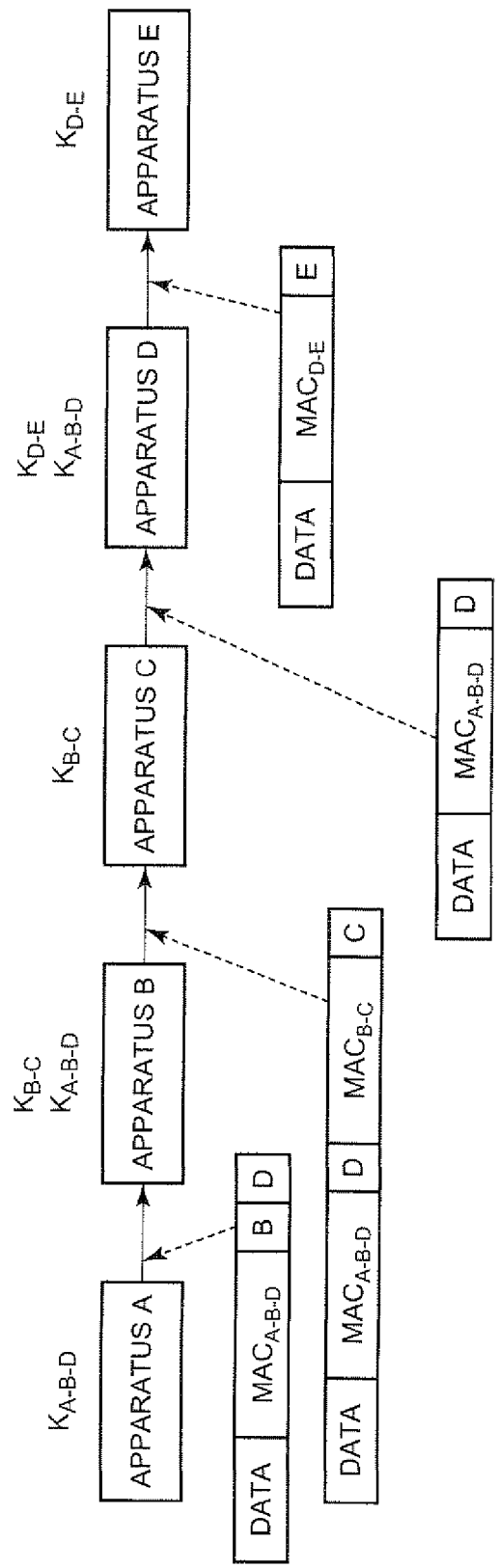
FIG. 12 is a diagram illustrating a modification of the operations of the second embodiment.

FIG. 4 is a diagram illustrating an example of the key information stored in the key-information storing unit 103. The capital letter "K" represents a key, and each notation including the capital letter "K" and a parenthesized string of letters means that the key is shared between or among apparatuses represented by capital letters which are connected together with a dash ("-"). For instance, "K(B-C)" represents a shared key shared between the apparatuses B, C. "K(A-B-D)" represents a shared key shared among the apparatuses A, B, D. In FIGS. 11 and 12, a subscript letter string of "A-B-D" written immediately below and to the right of the capital letter K carries a similar meaning.

The message authentication code verifying unit 104 accepts the packet received by the receiving unit 101. The message authentication code verifying unit 104 checks whether or not the received packet includes a message authentication code. If the received packet includes a message authentication code, the message authentication code verifying unit 104 generates a message authentication code from both the message included in the packet and the shared key stored in the key-information storing unit 103. The message authentication code verifying unit carries out the verification by judging whether or not the newly generated message authentication code and the received message authentication code are identical to each other. That a message authentication code identical to the received message authentication code can be generated means the same shared key is shared by the source apparatus and recipient apparatus of the received packet. Once it is verified that the newly generated message authentication code is identical to the received message authentication code, the relaying apparatus gets ready to receive the packet.

To this end, once it is verified that the newly generated message authentication code is identical to the received message authentication code, the message authentication code verifying unit 104 passes the received packet on to the first processing unit 105, which will be described later.

In contrast, if it is verified that the newly generated message authentication code is not identical to the received message authentication code, the message authentication code verifying unit 104 sends, to the transmitting unit 112, information indicating that the reception of the packet is not permitted.

On the basis of the ultimate-destination address of the packet (received packet) received by the receiving unit 101, the first processing unit 105 (the route-information extracting unit) judges whether or not the route-information storing unit 102 stores the route information including the ultimate-destination address of the received packet.

If the first processing unit 105 (the route-information extracting unit) judges that the route-information storing unit 102 stores such route information, the first processing unit 105 (the route-information extracting unit) extracts one or more first next forwarding-destination addresses which are associated with the ultimate-destination address. In addition, the first processing unit 105 (the route-information extracting unit) extracts, from the one or more extracted first next forwarding-destination addresses, a second next forwarding-destination address which is a first next forwarding-destination address being a forwarding target candidate. In this respect, if multiple second next forwarding-destination addresses exist, the first processing unit 105 (the route-information extracting unit) extracts one from the multiple second next forwarding-destination addresses. Subsequently, the first processing unit 105 (the route-information extracting unit) outputs the extracted second next forwarding-destination address to the second processing unit 106, which will be described later. Incidentally, no specific restriction is imposed on the method of extracting one second next forwarding-destination address from the multiple second next forwarding-destination addresses. For instance, the extraction may be done following the sequence in which the second next forwarding-destination addresses are stored in the route-information storing unit 102.

In the case shown in FIG. 3, for the ultimate-destination address "MDMS12$sa$," two relaying apparatuses 10$sa$, 10$se$ are stored as the next forwarding-destination addresses. Accordingly, these two next forwarding-destination addresses are extracted. In addition, concerning the item "forwarding permitted/unpermitted" (information indicating whether or not a particular address is a forwarding target candidate), the forwarding to the relaying apparatus 10$sa$ is unpermitted while the forwarding to the relaying apparatus 10$se$ is permitted. Accordingly, only the relaying apparatus 10$se$ is the address which can be the forwarding target candidate, so that the relaying apparatus 10$se$ is extracted.

If the first processing unit 105 (the route-information extracting unit) judges that the route-information storing unit 102 stores no route information, the first processing unit 105 (the route-information extracting unit) outputs, to the transmitting unit 112, information indicating that the received packet is not able to be forwarded.

The second processing unit 106 judges whether or not the received packet includes a message authentication code generated by use of the shared key shared between the next forwarding-destination apparatus and the previous source apparatus. In this respect, specific examples of the combination of the next forwarding-destination apparatus and the previous source apparatus include: a relaying apparatus specified by the second next forwarding-destination address and a transmitting apparatus; a relaying apparatus specified by the second next forwarding-destination address and another relaying apparatus; and a receiving apparatus specified by the second next forwarding-destination address and another relaying apparatus.

If the second processing unit 106 judges that the received packet includes the message authentication code generated by use of the shared key shared between the next forwarding-destination apparatus and the previous source apparatus, the second processing unit 106 outputs both the received packet and the second next forwarding-destination address to the first-packet generating unit 108.

Specific examples of the message authentication code generated by use of the shared key shared between the previous source apparatus and the next forwarding-destination apparatus include: a message authentication code generated by use of the shared key shared between a transmitting apparatus as the previous source and a relaying apparatus as the next destination; a message authentication code generated by use of the shared key shared between a relaying apparatus as the previous source and a relaying apparatus as the next destination; and a message authentication code generated by use of the shared key shared between a relaying apparatus as the previous source and a receiving apparatus as the next destination.

If the second processing unit 106 judges that the received packet does not include the message authentication code generated by use of the shared key shared between the next forwarding-destination apparatus and the previous source apparatus, the second processing unit 106 outputs both the received packet and the second next forwarding-destination address to the third processing unit 107 (the key checking unit).

Specific examples of the message authentication code generated by use of the shared key shared between the previous source apparatus and the next forwarding-destination apparatus include: a message authentication code generated by use of the shared key shared between a transmitting apparatus as the previous source and a relaying apparatus as the next destination; a message authentication code generated by use of the shared key shared between a relaying apparatus as the previous source and a relaying apparatus as the next destination; and a message authentication code generated by use of the shared key shared between a relaying apparatus as the previous source and a receiving apparatus as the next destination.

Once receiving the received packet and the second next forwarding-destination address, the third processing unit 107 (the key checking unit) judges whether or not the key-information storing unit 103 stores a shared key which is shared by the relaying apparatus of its own and the next forwarding-destination apparatus (i.e., the apparatus specified by the second next forwarding-destination address). Specific examples of the shared key shared by the relaying apparatus of its own and the next forwarding-destination apparatus include: a shared key shared by the relaying apparatus of its own and a relaying apparatus as the next destination apparatus; and a shared key shared by the relaying apparatus of its own and a receiving apparatus.

If the third processing unit 107 judges that the key-information storing unit 103 stores the shared key which is shared by the relaying apparatus of its own and the next forwarding-destination apparatus, the third processing unit 107 (the key checking unit) retrieves the found shared key from the key-information storing unit 103. Subsequently, the third processing unit 107 (the key checking unit) outputs the received packet, the second next forwarding-destination address, and the retrieved shared key to the message authentication code generating unit 109.

If the third processing unit 107 (the key checking unit) judges that the key-information storing unit 103 does not store the shared key which is shared by the relaying apparatus of its own and the next forwarding-destination apparatus, the third processing unit 107 outputs the second next forwarding-destination address to the third-packet generating unit 111.

On the basis of both the received packet and the second next forwarding-destination address received by the first-packet generating unit 108, the first-packet generating unit 108 generates a first packet which is a packet including both the data included in the received packet and the second next forwarding-destination address. Subsequently, the first-packet generating unit 108 outputs the generated first packet to the transmitting unit 112.

The message authentication code generating unit 109 receives the received packet, the second next forwarding-destination address, and the retrieved shared key (A1 shared key). On the basis of both the data included in the received packet and the A1 shared key, the message authentication code generating unit 109 generates a message authentication code (A1 message authentication code). Subsequently, the message authentication code generating unit 109 outputs the received packet, the second next forwarding-destination address, and the A1 message authentication code to the second-packet generating unit 110.

The second-packet generating unit 110 generates an A2 packet which is a packet including: the data included in the received packet; the second next forwarding-destination address; and the A1 message authentication code. Subsequently, the second-packet generating unit 110 outputs the generated A2 packet to the transmitting unit 112.

The third-packet generating unit 111 receives the second next forwarding-destination address. Thereafter, the third-packet generating unit 111 generates an A3 packet which is a packet including: the data included in the received packet; a request to generate an authentic code which is expected to be generated from a shared key (A2 shared key) shared between the next forwarding-destination apparatus and the previous source apparatus; and the second next forwarding-destination address.

Alternatively, the third-packet generating unit 111 may generate the A3 packet without including the request to generate the A2 shared key in the A3 packet. In this case, on the basis of the second next forwarding-destination address, the A2 shared key may be generated by the previous source apparatus which receives the second next forwarding-destination address from the transmitting unit 112, which will be described later.

Once receiving, from the first processing unit 105 (the route-information checking unit), the information indicating that the received packet is unable to be forwarded, the transmitting unit 112 sends, to the previous source apparatus, the information indicating that the received packet is unable to be forwarded.

Once receiving the A1 packet from the first-packet generating unit 108, the transmitting unit 112 forwards the A1 packet to the next forwarding-destination apparatus of the second next forwarding-destination address.

Once receiving the A2 packet from the second-packet generating unit 110, the transmitting unit 112 forwards the A2 packet to the next forwarding-destination apparatus of the second next forwarding-destination address.

Once receiving the A3 packet from the third-packet generating unit 111, the transmitting unit 112 forwards the A3 packet to the forwarding-destination apparatus.

Description will be turned to a case where a relaying apparatus is the previous source apparatus (transmitting apparatus).

The receiving unit 101 receives the A3 packet, and forwards the A3 packet to the third processing unit 107.

Upon receiving the A3 packet, the third processing unit 107 judges whether or not the key-information storing unit 103 stores the shared key (A2 shared key) shared by itself and the apparatus designated by the second next forwarding-destination address.

If the shared key (A2 shared key) shared by the third processing unit 107 and the apparatus designated by the second next forwarding-destination address is in the key-information storing unit 103, the third processing unit 107 extracts the shared key (A2 shared key) from the key-information storing unit 103.

The third processing unit 107 outputs the A3 packet and the shared key (A2 shared key) to the message authentication code generating unit 109.

On the basis of both the data included in the A3 packet and the shared key (A2 shared key), the message authentication code generating unit 109 generates a message authentication code (B1 message authentication code). Subsequently, the message authentication code generating unit 109 outputs the data included in the A3 packet, the shared key (A2 shared key), and the message authentication code (A2 message authentication code) to the second-packet generating unit 110.

The second-packet generating unit 110 generates a fourth packet which includes the data included in the A3 packet, the shared key (A2 shared key), and the message authentication code (A2 message authentication code). Subsequently, the second-packet generating unit 110 outputs the fourth packet to the transmitting unit 112.

Figure 5:
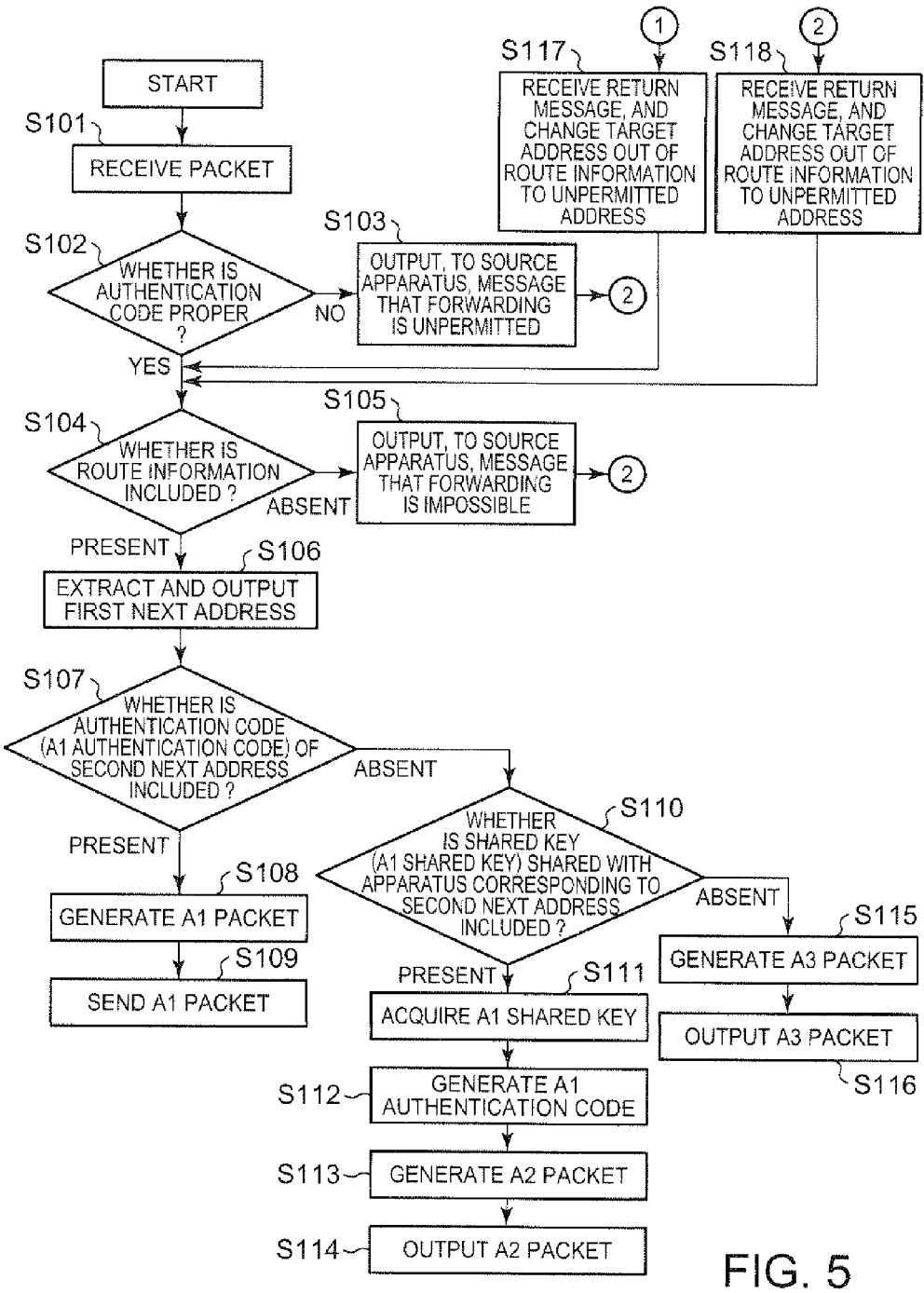
FIG. 5 is a flowchart showing an operational flow of the first embodiment.

Next, description will be provided for how each relaying apparatus shown in FIG. 2 operates. FIG. 5 is a flowchart showing the operations of the relaying apparatus.

The receiving unit 101 receives a packet sent from a transmitting apparatus or another relaying apparatus (S101). Subsequently, the receiving unit 101 passes the received packet to the message authentication code verifying unit 104.

The message authentication code verifying unit 104 checks whether or not the received packet includes a message authentication code (S102).

If the received packet includes no message authentication code (NO in step S102), the message authentication code verifying unit 104 sends the previous source apparatus, which is the source of the received packet, a return message indicating that the reception is impossible (S103).

If the received packet includes the message authentication code (YES in step S102), the message authentication code verifying unit 104 forwards the received packet to the first processing unit 105. On the basis of the ultimate-destination address of the packet, the first processing unit 105 makes a judgment about the existence or absence of the route information (S104).

In case of the absence of the route information, the first processing unit 105 outputs, to the transmitting unit 112, information indicating that the forwarding of the received packet is impossible (S105).

In case of the existence of the route information, the first processing unit 105 extracts a second next forwarding-destination address from the route-information storing unit 102, and outputs the extracted second next forwarding-destination address to the second processing unit 106 (S106).

The second processing unit 106 judges whether or not the received packet includes an A1 message authentication code generated by use of the shared key (A1 shared key) shared between the next forwarding-destination apparatus specified by the second next forwarding-destination address and the previous source apparatus (S107).

If the second processing unit 106 judges that the received packet includes the message authentication code (YES in step S107), both the received packet and the second next forwarding-destination address are outputted to the first-packet generating unit 108.

The first-packet generating unit 108 generates an A1 packet including both the data included in the received packet and the second next forwarding-destination address (S108), as well as sends the generated A1 packet to the transmitting unit 112 (S109).

If the second processing unit 106 judges that the received packet includes no A1 message authentication code (No in step S107), the third processing unit 107 judges whether or not the shared key (A1 shared key) shared between itself and the apparatus specified by the second next forwarding-destination address is in the key-information storing unit 103 (S110).

In case of the existence of the A1 shared key (YES in step S110), the A1 shared key is retrieved from the key-information storing unit 103 (S111). The message authentication code generating unit 109 generates an A1 message authentication code on the basis of the received packet, the second next forwarding-destination address, and the A1 shared key (S112). Subsequently, the second-packet generating unit 110 generates an A2 packet which includes: the data included in the received packet; the information on the second next forwarding-destination address; and the A1 message authentication code (S113). Then the second-packet generating unit 110 outputs the generated A2 packet to the transmitting unit 112 (S114).

In case of the absence of the A1 shared key (NO in step S110), the third-packet generating unit 111 generates an A3 packet including both the second next forwarding-destination address and a request to generate a shared key (A2 shared key) which is expected to be shared between the next forwarding-destination apparatus and the previous source apparatus (S115). Subsequently, the third-packet generating unit 111 outputs the generated A3 packet to the transmitting unit 112 (S116).

Operations in steps S117 and S118 will be described layer.

Figure 6:
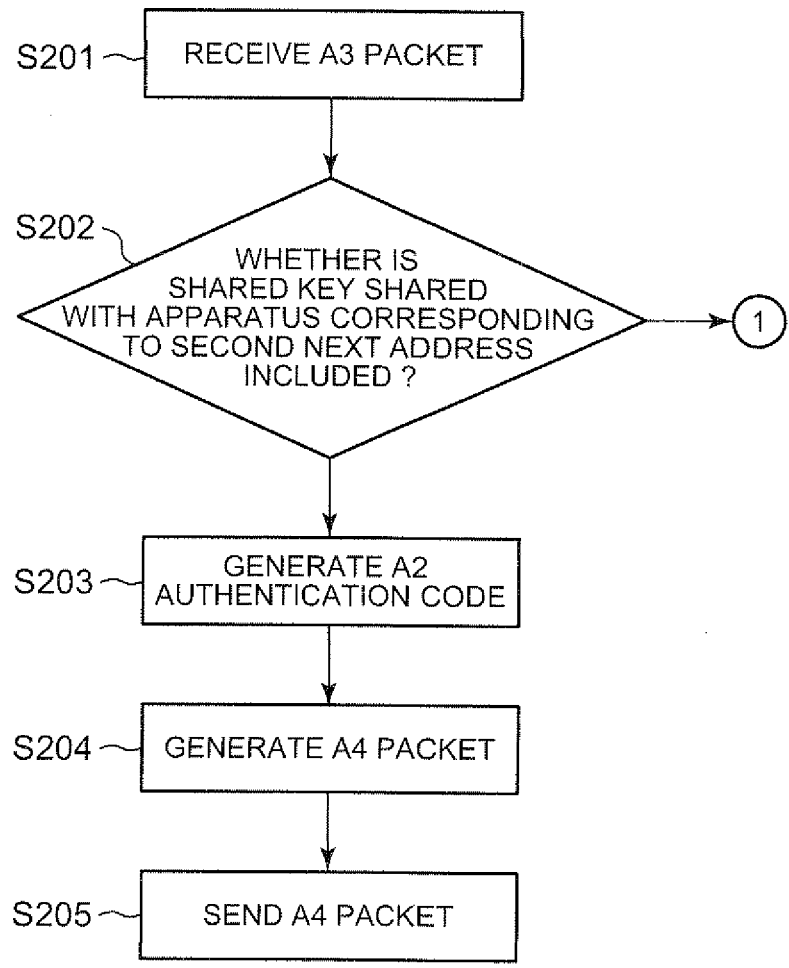
FIG. 6 is the other flowchart showing the operational flow of the first embodiment.

FIG. 6 is a flowchart showing how the previous source apparatus (relaying apparatus) operates when receiving the A3 packet.

The receiving unit 101 receives the A3 packet (S201). The A3 packet is thereafter outputted from the receiving unit 101 to the third processing unit 107.

Upon receiving the A3 packet, the third processing unit 107 judges whether the shared key (A2 shared key) shared by itself and the apparatus designated by the second next forwarding-destination address is in the key-information storing unit 103 (S202).

If the A2 shared key is in the key-information storing unit 103, the message authentication code generating unit 109 generates the message authentication code (A2 message authentication code) on the basis of both the data included in the A3 packet and the shared key (A2 shared key) (S203). Subsequently, the message authentication code generating unit 109 outputs the data included in the A3 packet, the shared key (A2 shared key), and the message authentication code (A2 message authentication code) to the second-packet generating unit 110.

The second-packet generating unit 110 generates the fourth packet which is a packet including: the data included in the A3 packet; the shared key (A2 shared key); and the message authentication code (A2 message authentication code) (S204). Subsequently, the second-packet generating unit 110 outputs the generated fourth packet to the transmitting unit 112 (S205).

If no A2 shared key is in the key-information storing unit 103, the third processing unit 107 outputs, to the first processing unit 105, information indicating that, out of the addresses stored in the route-information storing unit 102, the target address should be changed to an address to which the packet is not permitted to be forwarded. The first processing unit 105 changes the target address, out of the addresses stored in the route-information storing unit 102, to an address to which the packet is not permitted to be forwarded (S117). Subsequently, the first processing unit 105 further performs the operations at step S104 onwards.

The relaying apparatus receives the return message indicating that the transmission is unpermitted (S118). After that, the flow proceeds to the operation to check the route information (S104).

Figure 7:
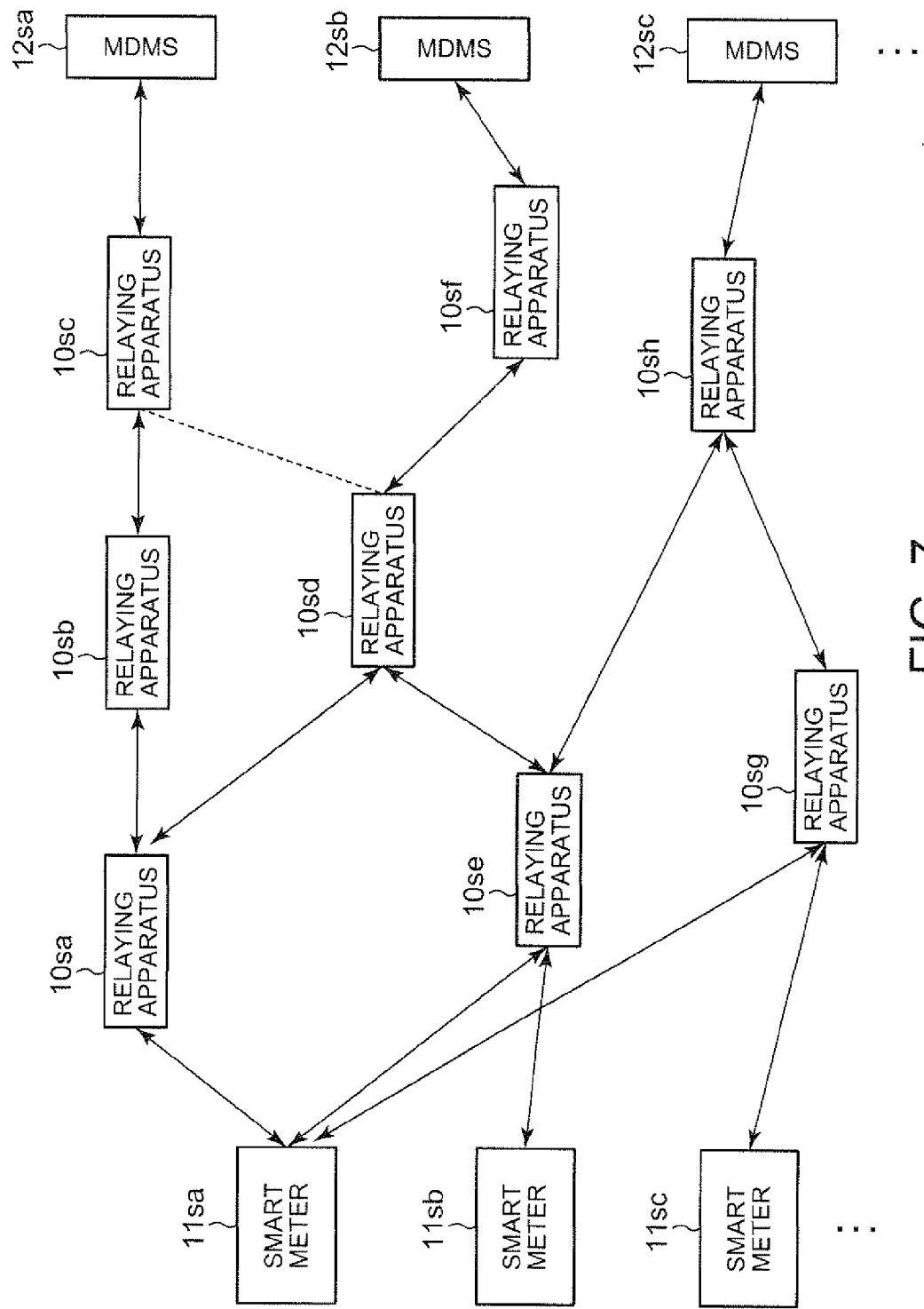
FIG. 7 is a diagram of an example of the first embodiment.

FIG. 7 illustrates an example of the configuration of a smart-grid communication network, which is taken as an example of the use of the relaying apparatuses of the above-described embodiment. In FIG. 7, smart meters 11sa to 11sc configured to calculate the electric power consumption communicate with MDMDs (standing for Meter Data Management Systems) 12sa to 12sc through the communication network with relaying apparatuses 10sa to 10sc assembling into some groups. Each MDMS receives and stores the electric power consumption sent from the smart meter of each of the households under the MDMS at constant intervals.

In the smart-grid communication network of this example, each packet passes through several relaying apparatuses until the packet reaches the ultimate-destination terminal apparatus after the departure from the source terminal apparatus. To prevent DoS (denial of service) attacks, the smart meters, the relaying apparatuses, and the MDMSs perform processing of packet authentication when packets are sent out to or flow in from the outside.

When receiving, from the smart meter 11 sa of a packet's source, a request to relay the packet, the relaying apparatus 10sa judges whether or not to relay the packet to the forwarding destination of the packet on the basis of whether or not the relaying apparatus 10sa has a shared key which is shared with the next relaying apparatus 10sb. The "shared key" means a secret key shared between the sending party and the receiving party. The use of the shared key enables MAC message authentication codes to be generated or verified. The relaying apparatus 10sa has a function of inquiring of the smart meter 11 sa about whether or not the smart meter 11sa has a shared key which is shared with the relaying apparatus 10sb as the forwarding destination in a case where the relaying apparatus 10sa is unable to relay the packet because the relaying apparatus 10sa can generate no MAC message authentication code to be used by the sending party and the receiving party due to the relaying apparatus 10sa not having the shared key in advance. If the smart meter 11sa has the shared key to be shared with the relaying apparatus 10sb, the smart meter 11 sa generates two MAC message authentication codes—one for the relaying apparatus 10sa and the other for the relaying apparatus 10sb. Then, the smart meter 11sa transfers a packet to the relaying apparatus 10sa. Once verifying the MAC message authentication code added to the packet, the relaying apparatus 10sa transfers, to the relaying apparatus 10sb, the packet together with the MAC message authentication code added by the smart meter 11sa.

Second Embodiment

Next, a second embodiment will be described.

The packet in this second embodiment includes not only the data and the message authentication code but also information on the number of times the verification or the transfer is to be performed (such information will be referred to as the transfer-control information). The transfer-control information is associated with the message authentication code.

Figure 8:
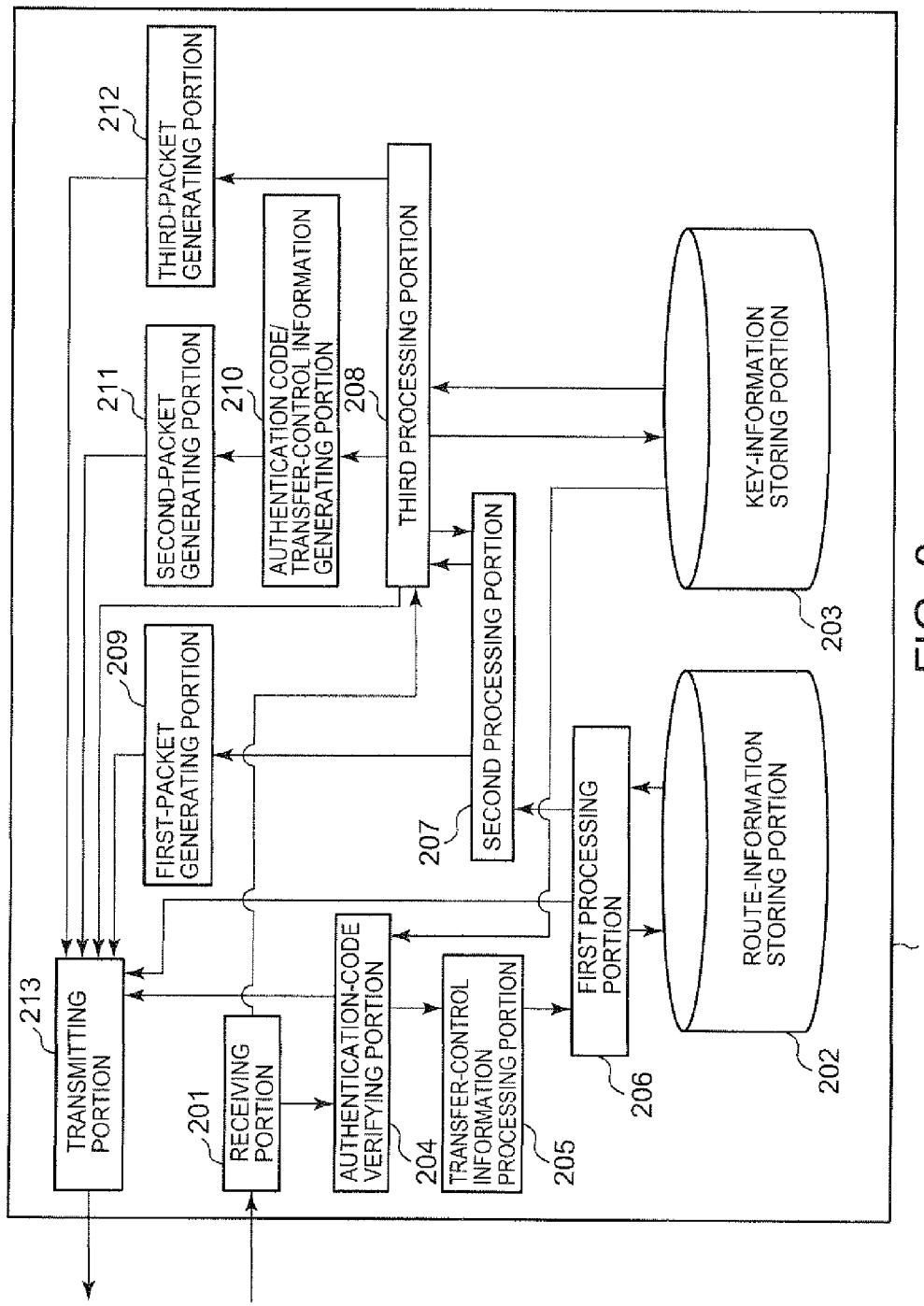
FIG. 8 is a diagram illustrating a configuration of a second embodiment.

FIG. 8 is a diagram illustrating a configuration of an information processing apparatus (a relaying apparatus in this case) of the second embodiment.

A receiving unit 201 receives a packet sent by either a transmitting apparatus or a different relaying apparatus. In this respect, the transmitting apparatus or the different relaying apparatus that sends the packet to the relaying apparatus will be referred to as a "previous source apparatus." The receiving unit 201 passes the received packet to the message authentication code verifying unit 204. The packet includes: data; a message authentication code generated from the data and a shared key possessed by the transmitting apparatus; address information of the previous source apparatus; and address information of the ultimate destination of the packet (ultimate-destination address).

A route-information storing unit 202 stores route information. The route information includes information that associates the ultimate-destination address with address information of the destination that the packet is to be forwarded next (first next forwarding-destination address). The ultimate-destination address in the case of this embodiment is address information of the receiving apparatus. The route information is used to determine where to forward the received packet. Another relaying apparatus or another receiving apparatus which is the next forward destination will be referred to as a "next forwarding-destination apparatus."

A key-information storing unit 203 stores a shared key shared between the relaying apparatus and the transmitting apparatus, a shared key shared between the relaying apparatus and another relaying apparatus, or a shared key shared between the relaying apparatus and the receiving apparatus.

If the message authentication code verifying unit 204 judges, as a result of the message authentication code verification, that a proper message authentication code is included in the received packet, the message authentication code verifying unit 204 outputs the received packet to a transfer-control information processing unit 205.

Upon receiving the received packet, the transfer-control information processing unit 205 changes the value of the transfer-control information by a predetermined method. If, as a result of the change, the resultant value satisfies a predetermined condition, the transfer-control information is deleted from the received packet. In this respect, an example of the above-mentioned predetermined method is to subtract one from the value of the transfer-control information corresponding to the message authentication code generated by use of the shared key shared between the previous source apparatus and the apparatus of its own. If the value of the transfer-control information becomes zero, the transfer-control information is deleted from the received packet. In this respect, the above-mentioned predetermined method is not limited to the above-described method of subtracting one. Alternatively, the transfer-control information may be subjected to a predetermined arithmetic operation, such as subtracting a predetermined number from the value of the transfer-control information or adding a predetermined number to that value. Subsequently, the transfer-control information processing unit 205 outputs the post-processed received packet to a first processing unit 206.

On the basis of the ultimate-destination address of the packet (received packet) received by the receiving unit 201, the first processing unit 206 (the route-information extracting unit) judges whether or not the route-information storing unit 202 stores the route information including the ultimate-destination address of the received packet.

If the first processing unit 206 (the route-information extracting unit) judges that the route-information storing unit 202 stores such route information, the first processing unit 206 (the route-information extracting unit) extracts one or more first next forwarding-destination addresses which are associated with the ultimate-destination address. In addition, the first processing unit 206 (the route-information extracting unit) extracts, from the one or more extracted first next forwarding-destination addresses, a second next forwarding-destination address which is a first next forwarding-destination address being a forwarding target candidate. In this respect, if multiple second next forwarding-destination addresses exist, the first processing unit 206 (the route-information extracting unit) extracts one from the multiple second next forwarding-destination addresses. Subsequently, the first processing unit 206 (the route-information extracting unit) outputs the extracted second next forwarding-destination address to the second processing unit 207, which will be described later. Incidentally, no specific restriction is imposed on the method of extracting one second next forwarding-destination address from the multiple second next forwarding-destination addresses. For instance, the extraction may be done following the sequence in which the second next forwarding-destination addresses are stored in the route-information storing unit 202.

If the first processing unit 206 (the route-information extracting unit) judges that the route-information storing unit 202 stores no route information, the first processing unit 206 (the route-information extracting unit) outputs, to the transmitting unit 213, information indicating that the received packet is not able to be forwarded.

The second processing unit 207 judges whether or not the received packet includes a message authentication code generated by use of the shared key shared between the next forwarding-destination apparatus and the previous source apparatus. In this respect, specific examples of the combination of the next forwarding-destination apparatus and the previous source apparatus include: a relaying apparatus specified by the second next forwarding-destination address and a transmitting apparatus; a relaying apparatus specified by the second next forwarding-destination address and another relaying apparatus; and a receiving apparatus specified by the second next forwarding-destination address and another relaying apparatus.

If the second processing unit 207 judges that the received packet includes the message authentication code generated by use of the shared key shared between the next forwarding-destination apparatus and the previous source apparatus, the second processing unit 207 outputs both the received packet and the second next forwarding-destination address to the first-packet generating unit 209.

Specific examples of the message authentication code generated by use of the shared key shared between the previous source apparatus and the next forwarding-destination apparatus include: a message authentication code generated by use of the shared key shared between a transmitting apparatus as the previous source and a relaying apparatus as the next destination; a message authentication code generated by use of the shared key shared between a relaying apparatus as the previous source and a relaying apparatus as the next destination; and a message authentication code generated by use of the shared key shared between a relaying apparatus as the previous source and a receiving apparatus as the next destination.

If the second processing unit 207 judges that the received packet does not include the message authentication code generated by use of the shared key shared between the next forwarding-destination apparatus and the previous source apparatus, the second processing unit 207 outputs both the received packet and the second next forwarding-destination address to the third processing unit 208 (the key checking unit).

Specific examples of the message authentication code generated by use of the shared key shared between the previous source apparatus and the next forwarding-destination apparatus include: a message authentication code generated by use of the shared key shared between a transmitting apparatus as the previous source and a relaying apparatus as the next destination; a message authentication code generated by use of the shared key shared between a relaying apparatus as the previous source and a relaying apparatus as the next destination; and a message authentication code generated by use of the shared key shared between a relaying apparatus as the previous source and a receiving apparatus as the next destination.

Once receiving the received packet and the second next forwarding-destination address, the third processing unit 208 judges whether or not the key-information storing unit 203 stores a shared key which is shared between the relaying apparatus of its own and the next forwarding-destination apparatus.

If the third processing unit 208 judges that the key-information storing unit 203 stores the shared key which is shared between the relaying apparatus of its own and the next forwarding-destination apparatus, the third processing unit 208 retrieves the found shared key and information on the number of times from the key-information storing unit 203. Subsequently, the third processing unit 208 outputs the received packet, the second next forwarding-destination address, the retrieved shared key, and the retrieved information on the number of times to the message authentication code/transfer-control information generating unit 210.

On the basis of both the received packet and the second next forwarding-destination address received by the first-packet generating unit 209, the first-packet generating unit 209 generates a first packet which is a packet including both the data included in the received packet and the second next forwarding-destination address. Subsequently, the first-packet generating unit 209 outputs the generated first packet to the transmitting unit 213.

The message authentication code/transfer-control information generating unit 210 receives the received packet, the second next forwarding-destination address, the retrieved shared key, and the retrieved information on the number of times. The message authentication code/transfer-control information generating unit 210 generates a message authentication code (B1 message authentication code) on the basis of both the data included in the received packet and the shared key, as well as generates transfer-control information on the basis of the information on the number of times. Subsequently, the message authentication code/transfer-control information generating unit 210 outputs the received packet, the second next forwarding-destination address, the generated message authentication code, and the generated transfer-control information to the second-packet generating unit 211.

The second-packet generating unit 211 receives the received packet, the second next forwarding-destination address, the generated message authentication code (B1 message authentication code), and the generated transfer-control information, as well as thus generates a packet (B2 packet) which includes: the data included in the received packet; the second next forwarding-destination address; and the B1 message authentication code. Subsequently, the second-packet generating unit 211 outputs the generated packet (B2 packet) to the transmitting unit 213.

The third-packet generating unit 212 receives the second next forwarding-destination address. Thereafter, the third-packet generating unit 212 generates an A3 packet which is a packet including: the data included in the received packet; a request to generate an authentic code which is expected to be generated from a shared key (B2 shared key) shared between the next forwarding-destination apparatus and the previous source apparatus; and the second next forwarding-destination address.

Alternatively, the third-packet generating unit 212 may generate the A3 packet without including the request to generate the B2 shared key in the A3 packet. In this case, on the basis of the second next forwarding-destination address, the B2 shared key may be generated by the previous source apparatus which receives the second next forwarding-destination address from the transmitting unit 213, which will be described later.

Once receiving, from the first processing unit 206 (the route-information checking unit), the information indicating that the received packet is unable to be forwarded, the transmitting unit 213 sends, to the previous source apparatus, the information indicating that the received packet is unable to be forwarded.

Once receiving the first packet from the first-packet generating unit 209, the transmitting unit 213 forwards the first packet to the next forwarding-destination apparatus of the second next forwarding-destination address.

Once receiving the A2 packet from the second-packet generating unit 210, the transmitting unit 213 forwards the A2 packet to the next forwarding-destination apparatus of the second next forwarding-destination address.

Once receiving the A3 packet from the first-packet generating unit 212, the transmitting unit 213 forwards the A3 packet to the next forwarding-destination apparatus.

Figure 9:
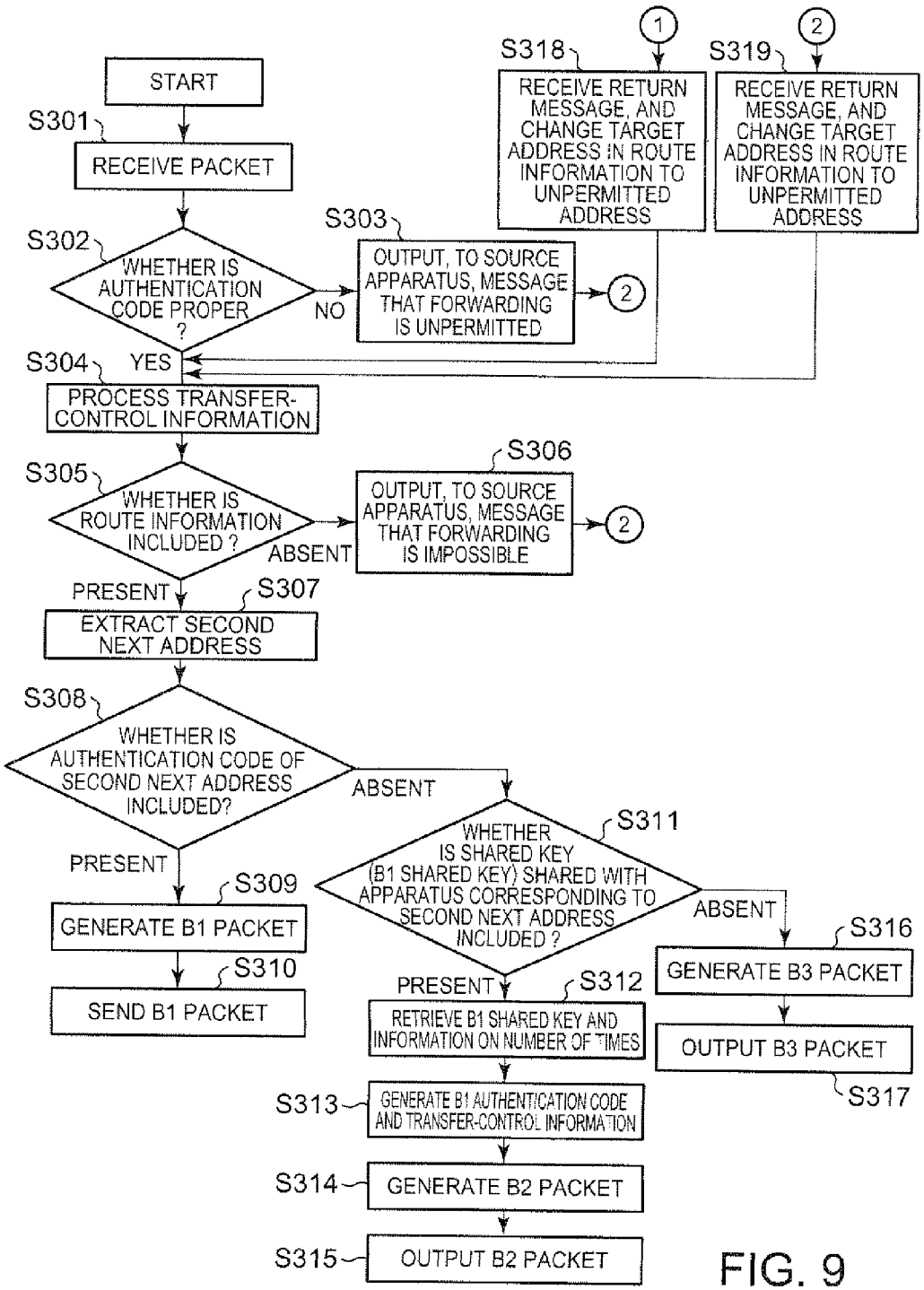
FIG. 9 is a flowchart showing an operational flow of the second embodiment.

Next, description will be provided for how each relaying apparatus shown in FIG. 8 operates. FIG. 9 is a flowchart schematically showing the operations of the relaying apparatus shown in FIG. 8.

The receiving unit 201 receives a packet sent from a transmitting apparatus or another relaying apparatus (S301). Subsequently, the receiving unit 201 passes the received packet to the message authentication code verifying unit 204.

The message authentication code verifying unit 204 checks whether or not the received packet includes a message authentication code (S302).

If the received packet includes no message authentication code (NO in step S302), the message authentication code verifying unit 204 sends a return message to the previous source apparatus which is the source of the received packet, indicating that the reception is impossible (S303).

If the message authentication code verifying unit 204 judges, as a result of the message authentication code verification, that a proper message authentication code is included in the received packet, the message authentication code verifying unit 204 outputs the received packet to the transfer-control information processing unit 205 (YES in step S302).

Upon receiving the received packet, the transfer-control information processing unit 205 subtracts one from the value of the transfer-control information corresponding to the message authentication code generated by use of the shared key shared between the previous source apparatus and the very apparatus of the transfer-control information processing unit 205. If the value of the transfer-control information becomes zero, the transfer-control information is deleted from the received packet (S304). Subsequently, the transfer-control information processing unit 205 outputs the post-processed received packet to the first processing unit 206. On the basis of the ultimate-destination address of the packet, the first processing unit 206 makes a judgment about the existence or absence of the route information (S305).

In case of the absence of the route information, the first processing unit 206 outputs, to the transmitting unit 213, information indicating that the forwarding of the received packet is impossible (S306).

In case of the existence of the route information, the first processing unit 206 extracts a second next forwarding-destination address from the route-information storing unit 202, as well as outputs the received packet and the second next forwarding-destination address to the second processing unit 207 (S307).

The second processing unit 207 judges whether or not the received packet includes a message authentication code generated by use of the shared key shared between the next forwarding-destination apparatus and the previous source apparatus (S308).

If the second processing unit 207 judges that the received packet includes the message authentication code (YES in step S308), both the received packet and the second next forwarding-destination address are outputted to the first-packet generating unit 209.

The first-packet generating unit 209 generates a first packet including both the data included in the received packet and the second next forwarding-destination address (S309), as well as sends the generated first packet to the transmitting unit 213 (S310).

If it is judged that the received packet includes no message authentication code (No in step S308), the third processing unit 208 associates the received packet and the second next forwarding-destination address, as well as judges whether or not the shared key (B1 shared key) shared between itself and the next forwarding-destination apparatus is in the key-information storing unit 203 (S110).

If the third processing unit 208 judges that the shared key (B1 shared key) shared between the relaying apparatus of its own and the forwarding-destination apparatus is in the key-information storing unit 203, the third processing unit 208 retrieves both the found B1 shared key and the information on the number of times from the key-information storing unit 203 (S312). Subsequently, the third processing unit 208 outputs, to the message authentication code/transfer-control information generating unit 210, the received packet, the second next forwarding-destination address, the retrieved B1 shared key, and the retrieved information on the number of times.

The message authentication code/transfer-control information generating unit 210 receives the received packet, the second next forwarding-destination address, the retrieved B1 shared key, and the retrieved information on the number of times. The message authentication code/transfer-control information generating unit 210 generates a message authentication code (B1 message authentication code) by use of both the data included in the received packet and the B1 shared key, as well as generates transfer-control information on the basis of the information on the number of times (S313). Subsequently, the message authentication code/transfer-control information generating unit 210 outputs the received packet, the second next forwarding-destination address, the generated message authentication code, and the generated transfer-control information to the second-packet generating unit 211.

The second-packet generating unit 211 receives the received packet, the second next forwarding-destination address, the generated message authentication code (B1 message authentication code), and the generated transfer-control information. Subsequently, the second-packet generating unit 211 generates a packet (B2 packet) including: the data included in the received packet; the second next forwarding-destination address; and the B1 message authentication code (S314). Thereafter, the second-packet generating unit 211 outputs the generated B2 packet to the transmitting unit 213 (S315).

In case of the absence of the B1 shared key (NO in step S311), the third-packet generating unit 212 generates an B3 packet including both the second next forwarding-destination address and a request to generate a shared key (B2 shared key) to be shared by the next forwarding-destination apparatus and the previous source apparatus (S316). Subsequently, the third-packet generating unit 212 outputs the generated B3 packet to the transmitting unit 213 (S317).

Operations in steps S318 and S319 will be described layer.

Figure 10:
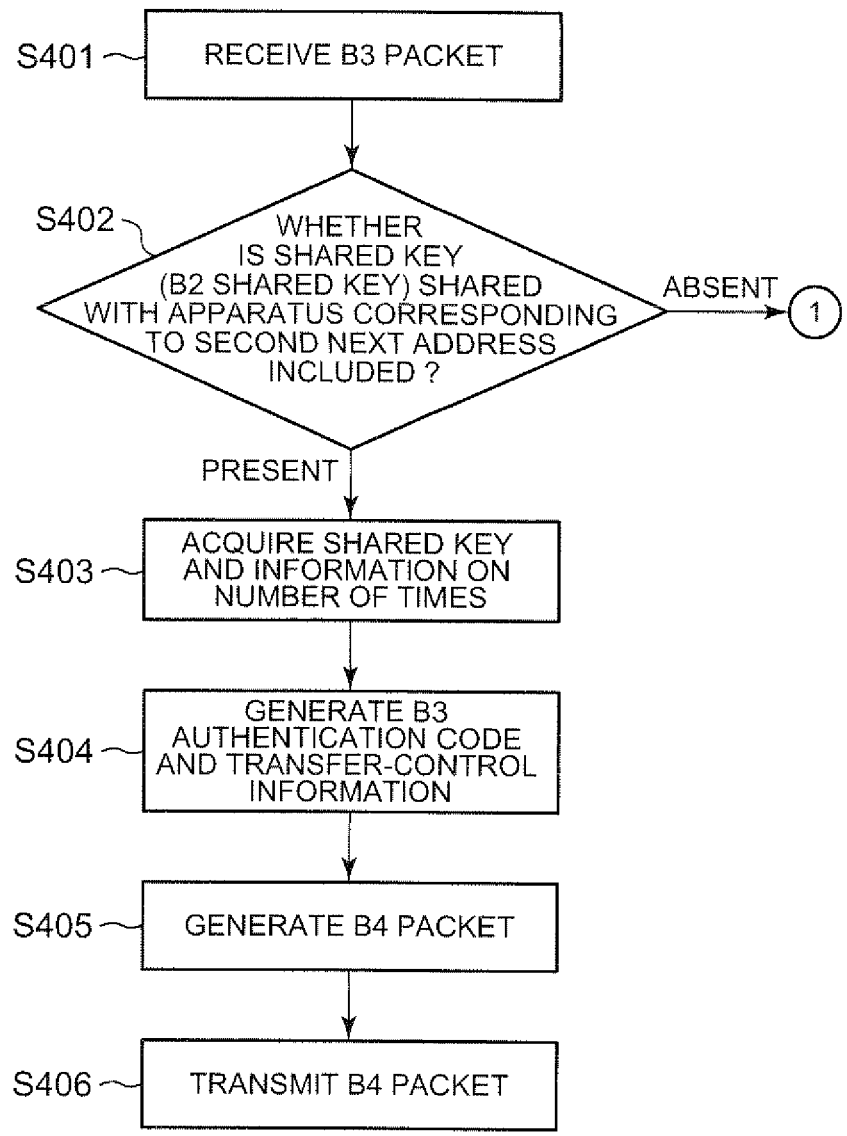
FIG. 10 is a flowchart showing the operational flow of the second embodiment.

FIG. 10 is a flowchart showing how the previous source apparatus (relaying apparatus) operates when receiving the B3 packet.

The receiving unit 201 receives the B3 packet (S401). The B3 packet is thereafter outputted from the receiving unit 201 to the third processing unit 208.

Upon receiving the B3 packet, the third processing unit 208 judges whether the shared key (B2 shared key) shared between itself and the apparatus designated by the second next forwarding-destination address is in the key-information storing unit 203 (S202).

If the B2 shared key is in the key-information storing unit 203, the message authentication code/transfer-control information generating unit 210 receives the received packet, the second next forwarding-destination address, the retrieved B2 shared key, and the information on the number of times (S403).

Thereafter, the message authentication code/transfer-control information generating unit 210 generates a message authentication code (B3 message authentication code) on the basis of both the data included in the received packet and the B2 shared key, whereas as well as generates the transfer-control information on the basis of the information on the number of times (S404). Subsequently, the message authentication code/transfer-control information generating unit 210 outputs the received packet, the second next forwarding-destination address, the generated message authentication code (B3 message authentication code), and the generated transfer-control information to the second-packet generating unit 211.

The second-packet generating unit 211 receives the received packet, the second next forwarding-destination address, the generated message authentication code (B3 message authentication code), and the generated transfer-control information. Subsequently, the second-packet generating unit 211 generates a packet (B4 packet) including: the data included in the received packet, the second next forwarding-destination address; and the B1 message authentication code (S405). Thereafter, the second-packet generating unit 211 outputs the generated B4 packet to the transmitting unit 213. The transmitting unit 213 transmits the B4 packet (S406).

If receiving, from another relaying apparatus which is the forwarding destination, a return message indicating that the transmission is impossible ((1) in FIG. 9 and (1) in FIG. 10), the relaying apparatuses changes the target address in the route information to be an address to which the packet is not permitted to be forwarded (S318). In addition, if the message authentication code verifying unit 204 judges that the message authentication code is not included there (NO at step S302; (2) in FIG. 9) or if the first processing unit 206 judges that the route information is not included there (NO at step S305; (2) in FIG. 9), the relaying apparatus changes the target address in the route information to be an address to which no packet is not permitted to be forwarded (S319).

Next, an example of the operations in the second embodiment will be described. FIG. 11 is a diagram illustrating a specific example of the operations.

Each of the smart meters and the relaying apparatuses includes the means (the message authentication code/transfer-control information generating unit 210) for setting up MAC transfer-control information together with a MAC message authentication code when the means generates the MAC message authentication code of a packet by use of the shared key shared between the meter or apparatus of its own and its communication counterpart. The information on whether the MAC message authentication code and the MAC transfer-control information should be deleted or continue to be transferred after the verification of the MAC message authentication code is described in the MAC transfer-control information.

Specifically, in a case where an MAC message authentication code is generated by use of a shared key shared among n persons, the MAC message authentication code needs to be verified by the other (n−1) sharers. For this reason, a value "n−1" is set in the MAC transfer-control information. (For instance, if an MAC message authentication code is generated by use of a shared key shared among three persons, the MAC message authentication code needs to be verified twice by the other two sharers. Hence, a value "2" is set in the MAC transfer-control information.) When the next terminal apparatus receives the packet and verifies the MAC message authentication code, the MAC transfer-control information is updated by subtracting one from the value set in the MAC transfer-control information. If the resultant value after the subtraction becomes zero, both the MAC message authentication code and the value set in the MAC transfer-control information are deleted. As long as the value set in the MAC transfer-control information is larger than zero, both the MAC code and the MAC transfer-control information continue to be transferred to the next relaying apparatus.

In the description given below, the capital letter "K" represents a key, and each notation including the capital letter "K" and a parenthesized string of letters means a key shared among apparatuses represented by capital letters which are connected together by a dash ("-"). In FIGS. 11 and 12 each subscript letter string written immediately below and to the right of the capital letter "K" represents a key shared between or among apparatuses represented by capital letters which are connected together by a dash ("-"). For instance, "K(A-B-D)" represents a shared key shared among the apparatuses A, B, D. In FIGS. 11 and 12 a subscript letter string of "A-B-D" carries a similar meaning. In addition, a message authentication code generated by use of the key K(A-B-D) is expressed as the MAC message authentication code MAC(A-B-D). In FIGS. 11 and 12 a subscript letter string of "A-B-D" written immediately below and to the right of an abbreviation "MAC" carries a similar meaning.

For instance, in FIG. 11, K(A-B-D) represents a shared key shared among the apparatuses A, B, D; K(B-C) represents a shared key shared between the apparatuses B, C; and K(D-E) represents a shared key shared between the apparatuses D, E.

Firstly, using a shared key K(A-B-D), the apparatus A generates an MAC message authentication code MAC(A-B-D) needed to be verified by the apparatuses B, D. In addition, the apparatus A sets a value "2" in the MAC transfer-control information. Subsequently, the apparatus A transfers a packet of the data to the apparatus B.

If the apparatus B can verify the MAC message authentication code by use of the shared key K(A-B-D), the apparatus B subtracts one from the value set in the MAC transfer-control information. Subsequently, the apparatus B generates an MAC message authentication code MAC(B-C) and MAC transfer-control information by use of a shared key K(B-C) shared with the apparatus C. Thereafter, the apparatus B transfers the packet to the apparatus C.

If the apparatus C can verify the MAC message authentication code MAC(B-C) by use of the shared key K(B-C), the apparatus C subtracts one from the value set in the MAC transfer-control information. Consequently, the value set in the MAC transfer-control information becomes zero. For this reason, the apparatus C removes the MAC message authentication code MAC(B-C) from the MAC transfer-control information, and transfers the resultant packet to the apparatus D.

If the apparatus D can verify the MAC message authentication code MAC(A-B-D) by use of the shared key K(A-B-D), the apparatus D subtracts one from the value set in the MAC transfer-control information. Consequently, the value set in the MAC transfer-control information becomes zero. For this reason, the apparatus D removes the MAC message authentication code MAC(A-B-D) from the MAC transfer-control information, and generates an MAC message authentication code MAC(D-E) and MAC transfer-control information by use of the key (D-E), as well as transfers the resultant packet to the apparatus E. Thereby, the apparatus E get ready to verify the MAC message authentication code MAC(D-E) by use of the shared key K(D-E).

In the alternative case shown in FIG. 12, the MAC transfer-control information includes a name or an ID that enables the apparatus verifying each MAC message authentication code to be identified. Once an apparatus can verify a particular MAC message authentication code, the apparatus deletes its own name from the MAC transfer-control information. When the MAC transfer-control information has no names, the MAC message authentication code is deleted, but not transferred to the next apparatus. For instance, in FIG. 12, K(A-B-D) represents a shared key shared among the apparatuses A, B, D; K(B-C) represents a shared key shared between the apparatuses B, C; and K(D-E) represents a shared key shared between the apparatuses D, E.

Firstly, using a shared key K(A-B-D), the apparatus A generates an MAC message authentication code MAC(A-B-D) needed to be verified by the apparatuses B, D. In addition, the apparatus A describes identifiers (names or the like) of the apparatus B, D in the MAC transfer-control information. Subsequently, the apparatus A transfers the resultant packet of the data to the apparatus B. If the apparatus B can verify the MAC message authentication code by use of the shared key K(A-B-D), the apparatus B removes its own identifier (name) from the MAC transfer-control information. Thereafter, the apparatus B generates an MAC message authentication code MAC(B-C) and MAC transfer-control information by use of a shared key K(B-C) shared with the apparatus C. Afterward, the apparatus B transfers the resultant packet to the apparatus C.

If the apparatus C can verify the MAC message authentication code MAC(B-C) by use of the shared key K(B-C), the apparatus C removes its own identifier (name) from the MAC transfer-control information, and accordingly blanks out its own identifier (name). For this reason, the apparatus C removes the MAC message authentication code MAC(B-C) from the MAC transfer-control info nation, and transfers the resultant packet to the apparatus D.

If the apparatus D can verify the MAC message authentication code MAC(A-B-D) by use of the shared key K(A-B-D), the apparatus D removes its own identifier (name) from the MAC transfer-control information, and accordingly blanks out its own identifier (name). For this reason, the apparatus D removes the MAC message authentication code MAC(A-B-D) from the MAC transfer-control information, and generates an MAC message authentication code MAC(D-E) and MAC transfer-control information by use of a key K(D-E), as well as transfer the resultant packet to the apparatus E. Thereby, the apparatus E gets ready to verify the MAC message authentication code MAC(D-E) by use of the K(D-E).

The providing of such MAC authentication-control information makes it possible to transfer and control an MAC message authentication code involving multiple (three or more) relaying apparatuses.

The embodiments of the invention makes it possible to reduce the number of MACs (message authentication codes) to be attached to a packet in a case where the packet, to which the MACs are attached, fails to be transferred between or among relaying apparatuses.

In addition, the overhead of the communication can be reduced, and the load of the authentication processing can be reduced as well. Besides, the risk of DoS attacks can also be reduced.

The techniques disclosed in the above-described embodiments may be distributed by being stored, as computer-executable programs, in various kinds of storage media such as magnetic discs (e.g., Floppy® discs, hard disk drives, etc.), optical discs (e.g., CD-RAMS, DVDs, etc.), magneto-optical discs (MOs), and semiconductor memories.

In addition, as the storage media, any type of storage is allowed as long as the storage medium can store a program and is computer-readable.

Furthermore, an operating system (OS) and middleware such as database management software, network software which are run on a computer in accordance with the instructions given by a program installed in the computer from a storage medium, may execute some part of the processing needed to implement the embodiments.

Moreover, the storage media usable by the invention is not necessarily a medium independent of the computer. Usable storage media include a storage medium either temporarily holding or storing a downloaded program transmitted through a LAN, the Internet, or the like.

In addition, the number of storage media is not necessarily one. Even when the processing described in the embodiments is executed by multiple media, the multiple storage media are included in the storage media usable by the invention. In addition, any configuration of the media is allowable.

The computer usable by the invention is an apparatus to execute the processing of the embodiments in accordance with the program stored in the storage medium. The computer may be a single apparatus such as a personal computer, or may be a system or the like in which multiple apparatuses are connected to one another by a network.

In addition, the computer usable by the invention is not necessarily a personal computer. The term "computer" used in the description of the invention includes arithmetic processing units included in information processing apparatuses, microcomputers, and the like. The term "computer" is a generic name given to apparatuses and systems that are capable to implement the functions of the invention on a basis of a program.

Some embodiments of the invention have been described, but those embodiments are described for the illustrative purposes only, not for the purpose of restricting the scope of the invention. Those novel embodiments can be carried out in various other forms. Various kinds of omission, replacement, and modification can be made without departing from the spirit of the invention. Such other embodiments and the modifications thereof are included in the scope and the spirit of the invention, and also in the invention described in the claims and its equivalents.

What is claimed is:

1. An information processing apparatus comprising:
a receiving unit configured to receive a packet sent from a first apparatus, the packet including data and an ultimate destination address which represents address information of an ultimate destination;
a route information storing unit configured to store the ultimate destination address and one or more first next destination addresses in association with each other, each first next destination address representing information of an address of a next forwarding destination;

a key information storing unit configured to store one or more first shared keys, each first shared key being a key shared between the information processing apparatus itself and a different information processing apparatus;

a first processing unit configured to judge, on the basis of the received ultimate destination address, whether or not the route information storing unit stores one or more associated first next destination addresses, and, if so, extracting one of the associated first next destination addresses as a second next destination address;

a second processing unit configured to judge whether or not a received packet includes a message authentication code for the second next destination address, on the basis of the received packet and the second next destination address;

a first packet generating unit configured to generate a first packet on the basis of the received packet and the second next destination address in the case where the received packet includes the message authentication code for the second next destination address;

a third processing unit configured to judge whether or not the key information storing unit stores, as a second shared key, a first shared key shared between the information processing apparatus itself and another information processing apparatus specified by the second next destination address, in the case where the received packet does not include the message authentication code for the second next destination address;

a message authentication code generating unit configured to generate a first message authentication code on the basis of the data and the second shared key in the case where the key information storing unit stores the second shared key;

a second packet generating unit configured to generate a second packet including the ultimate destination address, the data, and the first message authentication code;

a third packet generating unit configured to generate a third packet, which includes a next destination and information indicating that the generation of a message authentication code is impossible, in the case where the key information storing unit does not store the second shared key; and a transmitting unit configured to transmit one of the first packet, the second packet or the third packet.

2. The apparatus according to claim 1, wherein the receiving unit further receives, from a second apparatus, a fourth packet including: a next destination address representing address information of a next destination to which the second apparatus is to forward a packet; and information indicating that the generation of a message authentication code is impossible, the key information judging unit further judges whether or not the key information storing unit stores, as a second shared key, a key shared between the information processing apparatus itself and the information processing apparatus specified by the next destination address received from the second apparatus, in the case of storing the second shared key, the message authentication code generating unit generates a second message authentication code on a basis of the data and the second shared key shared between the information processing apparatus itself and the information processing apparatus specified by the next destination address received from the second apparatus, and generates a fifth packet including the ultimate destination address, the data, the first message authentication code and the second message authentication code, and in the case of not storing the second shared key, the transmitting unit transmits the fifth packet to the second apparatus.

3. The apparatus according to claim 1, wherein the third processing unit judges whether or not the key information storing unit stores the first shared key shared between the information processing apparatus itself and the another information processing apparatus.

4. An information processing apparatus comprising:

a receiving unit configured to receive a first packet sent from a first apparatus, the first packet including data, a message authentication code and an ultimate destination address representing address information of an ultimate destination;

a message authentication code verifying unit configured to verify whether or not the received packet includes a proper message authentication code;

a route information storing unit configured to store the ultimate destination address and one or more first next destination addresses in association with each other, each first next destination address representing address information of a next forwarding destination;

a transfer control information processing unit configured to change a value set in transfer control information by a predetermined method if a result of the verification shows that the received packet includes the proper message authentication code;

a first processing unit configured to judge, on the basis of the received ultimate destination address, whether or not the route information storing unit stores one or more associated first next destination addresses, and, if so, extracting one of the associated first next destination addresses as a second next destination address;

a second processing unit configured to judge whether or not a received packet includes a message authentication code for the second next destination address, on the basis of the received packet and the second next destination address;

a key information storing unit configured to store one or more first shared keys, each first shared key being a key shared between the information processing apparatus itself and a different information processing apparatus;

a first packet generating unit configured to generate a first packet on a basis of the received packet and the second next destination address in the case where the received packet includes the message authentication code for the second next destination address;

a third processing unit configured to judge whether or not the key information storing unit stores, as a second shared key, a first shared key shared between the information processing apparatus itself and another information processing apparatus specified by the second next destination address, in the case where the received packet does not include the message authentication code for the second next destination address;

a message authentication code generating unit configured to generate a first message authentication code on the basis of the data and the first shared key in the case where the key information storing unit stores the second shared key;

a second packet generating unit configured to generate a second packet including the ultimate destination address, the data, and the first message authentication code;

a third packet generating unit configured to generate a third packet, which includes a next destination and information indicating that the generation of a message authentication code is impossible, in the case where the key information storing unit does not store the first shared key; and a transmitting unit configured to transmit one of the first packet, the second packet or the third packet.

5. An information processing method to relay data from a source apparatus to an ultimate destination apparatus via a relay apparatus, the method comprising:

receiving a packet;

judging the existence of route information stored in a route information storing unit, based on an ultimate destination address of the packet;

extracting a next forwarding destination address from the route information storing unit in the case of the existence of the route information;

judging whether the received packet includes a message authentication code regarding the next forwarding destination apparatus specified by the next forwarding destination address and the source apparatus;

in the case where the received packet does not include the message authentication code, judging whether a shared key shared between the relay apparatus and the next forwarding destination apparatus is stored in a key information storing unit; and in the case of the absence of the shared key, generating a request packet including the next forwarding destination address and a request to generate a new shared key to be shared between the next forwarding destination apparatus and the source apparatus.

6. The method according to claim 5, further comprising:
verifying whether or not the received packet includes a message authentication code; and
sending a return message, indicating that reception is impossible, to the source apparatus, if the received packet includes no message authentication code.

7. The method according to claim 6, further comprising:
outputting information indicating that forwarding of the received packet is impossible in the case of absence of the route information.

8. The method according to claim 5, further comprising:
generating a relay packet including the data included in the received packet and the next forwarding destination address, if the received packet includes the message authentication code; and
transmitting the relay packet.

9. The method according to claim 5, further comprising:
in the case of the existence of the shared key, generating a message authentication code on the basis of the received packet, the next forwarding destination address and the shared key;
generating a relay packet which includes the received packet, the information on the next forwarding destination address and the generated message authentication code; and
transmitting the relay packet.

10. The method according to claim 5, further comprising:
receiving the request packet at the source apparatus; and
upon receiving the request packet, judging whether a the shared key shared by the source apparatus and the next forwarding destination apparatus exists in the source apparatus.

11. The method according to claim 10, further comprising:
generating a message authentication code based on the request packet and the shared key, if the shared key exists at the source apparatus;
generating a fourth packet which includes the data included in the request packet, the shared key and the generated message authentication code; and
transmitting the fourth packet.

12. The method according to claim 11, further comprising:
if no shared key exists at the source apparatus, outputting information indicating that the next forwarding destination address should be changed to an address where the packet is not permitted to be forwarded.

13. The method according to claim 12, further comprising:
verifying whether the received packet includes the message authentication code; and
if the received packet includes the correct message authentication code, processing transfer control information so as to reduce the value of the transfer control information corresponding to the message authentication code generated by the shared key shared between the source apparatus and the relay apparatus.

14. The method according to claim 13, further comprising:
if the value of the transfer control information is less than a predetermined value, deleting the transfer control information from the received packet.

15. The method according to claim 5, wherein
the extracting step further extracts a plurality of next forwarding destination addresses which are associated with the ultimate destination address, and extracts, from a plurality of the extracted first next forwarding destination addresses, one of the next forwarding destination addresses as a forwarding target.

* * * * *